United States Patent
Masters (10) Patent No.: US 8,645,556 B1
(45) Date of Patent: *Feb. 4, 2014

(54) METHOD AND SYSTEM FOR REDUCING MEMORY USED FOR IDLE CONNECTIONS

(75) Inventor: Richard Roderick Masters, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 1589 days.

This patent is subject to a terminal disclaimer.

(21) Appl. No.: 10/409,951

(22) Filed: Apr. 8, 2003

Related U.S. Application Data (60) Provisional application No. 60/381,028, filed on May 15, 2002.

(51) Int. Cl.
*G06F 15/16* (2006.01)

(52) U.S. Cl.
USPC .............. 709/230; 709/223; 709/224; 703/21

(58) Field of Classification Search
USPC ......... 709/230, 227–229, 201–203, 223–224; 703/21
See application file for complete search history.

(56) References Cited

U.S. PATENT DOCUMENTS

| | | | | |
|---|---|---|---|---|
| 5,553,242 | A | * | 9/1996 | Russell et al. ................ 709/227 |
| 5,774,660 | A | | 6/1998 | Brendel et al. |
| 5,835,724 | A | * | 11/1998 | Smith ........................... 709/227 |
| 5,941,988 | A | * | 8/1999 | Bhagwat et al. ................ 726/12 |
| 6,104,716 | A | | 8/2000 | Crichton et al. |
| 6,128,657 | A | | 10/2000 | Okanoya et al. |
| 6,175,867 | B1 | | 1/2001 | Taghadoss |
| 6,182,122 | B1 | | 1/2001 | Berstis |
| 6,226,684 | B1 | | 5/2001 | Sung et al. |
| 6,253,226 | B1 | * | 6/2001 | Chidambaran et al. ....... 718/104 |
| 6,298,380 | B1 | * | 10/2001 | Coile et al. .................... 709/227 |
| 6,304,908 | B1 | | 10/2001 | Kalajan |
| 6,360,262 | B1 | | 3/2002 | Guenthner et al. |
| 6,370,584 | B1 | | 4/2002 | Bestavros et al. |
| 6,381,638 | B1 | | 4/2002 | Mahler et al. |
| 6,411,986 | B1 | * | 6/2002 | Susai et al. .................... 709/203 |

(Continued)

OTHER PUBLICATIONS

Jeffrey C. Mogul, "The case for persistent-connection HTTP", Proceedings of the conference on Applications, technologies, architectures, and protocols for computer communication, p. 299-313, Aug. 28-Sep. 1, 1995, Cambridge, Massachusetts, United States [retrieved from ACM database on Dec. 17, 2009].*

(Continued)

*Primary Examiner* — Saleh Najjar
*Assistant Examiner* — Jason Plotkin
(74) *Attorney, Agent, or Firm* — Frommer Lawrence & Haug LLP; John W. Branch (57) ABSTRACT

A method and system for reducing memory required to maintain connection states in a traffic manager. A network device receives a message from a client in which at least a portion of the message is to be forward to a first server. If the network device is maintaining information for facilitating a first connection with a second server, the network device maintains a subset of the information for use in restoring the first connection and frees memory associated with information that is not needed for restoring the first connection. The network device then employs other previously stored information to restore the state of a second connection to the first server. The network device then sends at least a portion of the message to the first server using the second connection.

18 Claims, 8 Drawing Sheets

(56) References Cited

U.S. PATENT DOCUMENTS

| | | | |
|---|---|---|---|
| 6,650,640 | B1 | 11/2003 | Muller et al. |
| 6,654,701 | B2 | 11/2003 | Hatley |
| 6,697,363 | B1 | 2/2004 | Carr |
| 6,754,662 | B1 | 6/2004 | Li |
| 6,766,373 | B1 * | 7/2004 | Beadle et al. ............... 709/227 |
| 6,829,238 | B2 | 12/2004 | Tokuyo et al. |
| 6,928,082 | B2 * | 8/2005 | Liu et al. .................. 370/401 |
| 6,950,434 | B1 | 9/2005 | Viswanath et al. |
| 6,954,780 | B2 * | 10/2005 | Susai et al. ................. 709/203 |
| 6,957,272 | B2 | 10/2005 | Tallegas et al. |
| RE38,902 | E | 11/2005 | Srisuresh et al. |
| 6,963,982 | B1 | 11/2005 | Brustoloni et al. |
| 6,978,334 | B2 | 12/2005 | Hiratsuka |
| 7,007,092 | B2 | 2/2006 | Peiffer |
| 7,103,045 | B2 | 9/2006 | Lavigne et al. |
| 7,136,385 | B2 | 11/2006 | Damon et al. |
| 7,139,792 | B1 | 11/2006 | Mishra et al. |
| 7,146,417 | B1 | 12/2006 | Coile et al. |
| 7,161,947 | B1 | 1/2007 | Desai |
| 7,215,637 | B1 | 5/2007 | Ferguson et al. |
| 7,225,237 | B1 | 5/2007 | Tenereillo |
| 7,231,446 | B2 | 6/2007 | Peiffer et al. |
| 7,254,639 | B1 | 8/2007 | Siegel et al. |
| 7,277,924 | B1 | 10/2007 | Wichmann et al. |
| 7,321,926 | B1 | 1/2008 | Zhang et al. |
| 7,366,781 | B2 | 4/2008 | Abjanic |
| 7,376,731 | B2 | 5/2008 | Khan et al. |
| 7,657,618 | B1 | 2/2010 | Rothstein et al. |
| 7,720,980 | B1 | 5/2010 | Hankins et al. |
| 7,774,484 | B1 | 8/2010 | Masters et al. |
| 8,009,566 | B2 | 8/2011 | Zuk et al. |
| 2001/0023442 | A1 | 9/2001 | Masters |
| 2002/0025036 | A1 | 2/2002 | Sato |
| 2002/0055980 | A1 | 5/2002 | Goddard |
| 2002/0055983 | A1 | 5/2002 | Goddard |
| 2002/0059428 | A1 | 5/2002 | Susai et al. |
| 2002/0078174 | A1 | 6/2002 | Sim et al. |
| 2002/0105931 | A1 | 8/2002 | Heinonen et al. |
| 2002/0112071 | A1 | 8/2002 | Kim |
| 2002/0120743 | A1 | 8/2002 | Shabtay et al. |
| 2002/0138627 | A1 | 9/2002 | Frantzen et al. |
| 2002/0138739 | A1 | 9/2002 | Scheetz et al. |
| 2003/0091025 | A1 | 5/2003 | Celi et al. |
| 2003/0145077 | A1 | 7/2003 | Khan et al. |
| 2003/0208600 | A1 | 11/2003 | Cousins |
| 2004/0205597 | A1 | 10/2004 | Abjanic |
| 2004/0225810 | A1 | 11/2004 | Hiratsuka |
| 2005/0138243 | A1 | 6/2005 | Tierney et al. |
| 2008/0253366 | A1 | 10/2008 | Zuk et al. |
| 2010/0121953 | A1 | 5/2010 | Friedman et al. |

OTHER PUBLICATIONS

Snoeren, A.C., D.G. Andersen and H. Balakrishnan. Fine-Grained Failover Using Connection Migration. in Third Annual USENIX Symposium on Internet Technologies and Systems, 2001. [retrieved from Internet ="http://walfredo.dsc.ufcg.ed u.br/cursos/apdist20011/Snoeren01 .pdf" on Jun. 18, 2010]. V.*

Network Working Group; Request for Comments: 2068; Category: Standards Track; *Hypertext Transfer Protocol*—HTTP/1.1; R. Fielding; UC Irvine, J. Gettys; J. Mogul; DEC, H. Frystyk; T. Berners-Lee; MIT/LCS, dated Jan. 1997, pp. 1-152.

Network Working Group; Request for Comments; 2616; Obsoletes: 2068; Category: Standards Track; *Hypertext Transfer Protocol*—HTTP/1.1; R. Fielding; UC Irvine, J. Gettys; Compaq/W3C; J. Mogul; Compaq; H. Frystyk; W3C/MIT; L. Masinter; Xeriox; P. Leach; Microsoft; T. Berners-Lee; W3C/MIT; dated Jun. 1999, pp. 1-165.

F5 Networks; *BIG-IP Controller with Exclusive OneConnect Content Switching Feature Provides a Breakthrough System for Maximizing Server and Network Performance*; Networld + Interop, Las Vegas, NV, May 8, 2001, Alane Moran, Holly Hagerman, pp. 1-3.

U.S. Appl. No. 10/172,411, Official Communication mailed Oct. 17, 2007.

U.S. Appl. No. 10/172,411; Official Communication mailed Apr. 30, 2007.

U.S. Appl. No. 10/172,411; Official Communication mailed Nov. 13, 2006.

U.S. Appl. No. 10/172,411; Official Communication mailed Sep. 1, 2006.

U.S. Appl. No. 10/172,411; Official Communication mailed Jun. 19, 2006.

U.S. Appl. No. 10/172,411; Official Communication mailed Dec. 16, 2005.

Hochmuth, Phil, F5, CacheFlow pump up content-delivery lines, May 4, 2001, Network World.

U.S. Appl. No. 12/327,742; Official Communication mailed Aug. 4, 2010.

U.S. Appl. No. 10/172,411; Official Communication mailed Apr. 25, 2008.

U.S. Appl. No. 10/172,411; Notice of Allowance mailed Oct. 1, 2008.

Reardon, Marguerite, "A Smarter Session Switch: Arrowpoint's CS Session Switches Boast The Brains Needed for E-Commerce," Data Communications, Jan. 1999, title page, pp. 3, 5, 18.

Hewitt, John R. et al., "Securities Practice and Electronic Technology," Corporate Securities Series, (New York: Law Journal Seminars-Press) 1998, title page, pp. 4.29-4.30.

Official Communication for U.S. Appl. No. 13/445,843 mailed May 17, 2013.

Official Communication for U.S. Appl. No. 12/327,742 mailed Jun. 5, 2012.

Official Communication for U.S. Appl. No. 13/445,843 mailed Jun. 4, 2012.

Official Communication in U.S. Appl. No. 12/327,742 mailed Nov. 15, 2012.

Official Communication for U.S. Appl. No. 12/327,742 mailed May 3, 2013.

Official Communication for U.S. Appl. No. 13/445,843 mailed Feb. 20, 2013.

Acharya et al., "Scalable Web Request Routing with MPLS," IBM Research Report, IBM Research Division, Dec. 5, 2001.

Yeom, H. Y. et al, "IP Multiplexing by Transparent Port-Address Translator," Proceedings of the 10th USENIX System Administration Conference, Chicago, IL, USA, 1996, pp. 1-16.

Official Communication for U.S. Appl. No. 10/385,790 mailed Apr. 8, 2008.

Official Communication for U.S. Appl. No. 10/385,790 mailed Sep. 2, 2008.

Official Communication for U.S. Appl. No. 10/385,790 mailed Mar. 4, 2009.

Official Communication for U.S. Appl. No. 10/385,790 mailed Sep. 10, 2009.

Official Communication for U.S. Appl. No. 10/385,790 mailed Apr. 2, 2010.

Official Communication for U.S. Appl. No. 12/837,420 mailed Jan. 5, 2011.

Official Communication for U.S. Appl. No. 12/837,420 mailed Mar. 2, 2011.

Official Communication for U.S. Appl. No. 12/327,742 mailed Aug. 18, 2011.

Official Communication for U.S. Appl. No. 12/837,420 mailed Nov. 25, 2011.

Official Communication for U.S. Appl. No. 13/300,398 mailed Jan. 12, 2012.

* cited by examiner

METHOD AND SYSTEM FOR REDUCING MEMORY USED FOR IDLE CONNECTIONS

RELATED APPLICATION

This application is a Utility Patent application based on a previously filed U.S. Provisional Patent application, U.S. Ser. No. 60/381,028 filed on May 15, 2002, the benefit of the filing date of which is hereby claimed under 35 U.S.C. §119(e).

FIELD OF THE INVENTION

This application relates generally to networks, and, more specifically, to reducing memory used in accessing servers.

BACKGROUND

The Internet's core bandwidth continues to increase every year. Some of this additional bandwidth is consumed as more and more users access the Internet. Other additional bandwidth is consumed as existing users increase their use of the Internet. This increase of Internet use translates into an increase in traffic directed to and from World Wide Web (WWW) servers and other servers connected to the Internet.

Replacing a WWW server with a WWW server of twice the capacity is a costly undertaking. Adding additional WWW servers to a group of servers servicing requests is less costly but generally requires a traffic management device to distribute traffic. The traffic management device may be configured to distribute traffic to each server so that multiple servers can service requests.

With a sufficient amount of traffic between client computers and servers, a traffic management device can run out of memory used to store connection state information.

DETAILED DESCRIPTION

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined by the appended claims.

In one exemplary aspect of the invention, a network device receives a message from a client at least a portion of the message that is to be forward to a first server. If the network device is maintaining information for facilitating a first connection with a second server, the network device maintains a subset of the facilitation information for use in restoring the first connection and frees memory associated with the facilitation information that is not needed for restoring the first connection. The network device then employs other previously stored facilitation information to restore the state of a second connection to the first server. The network device then sends at least a portion of the message to the first server using the second connection. This and other aspects of the invention are described in more detail below.

In the following description, first an illustrative operating environment in which the invention may be practiced is disclosed. Then, an illustrative arrangement and interaction of elements using within an operating environment are described. Finally, exemplary methods employed by the elements to reduce memory used for idle connections are described.

Illustrative Operating Environment

Figure 1:
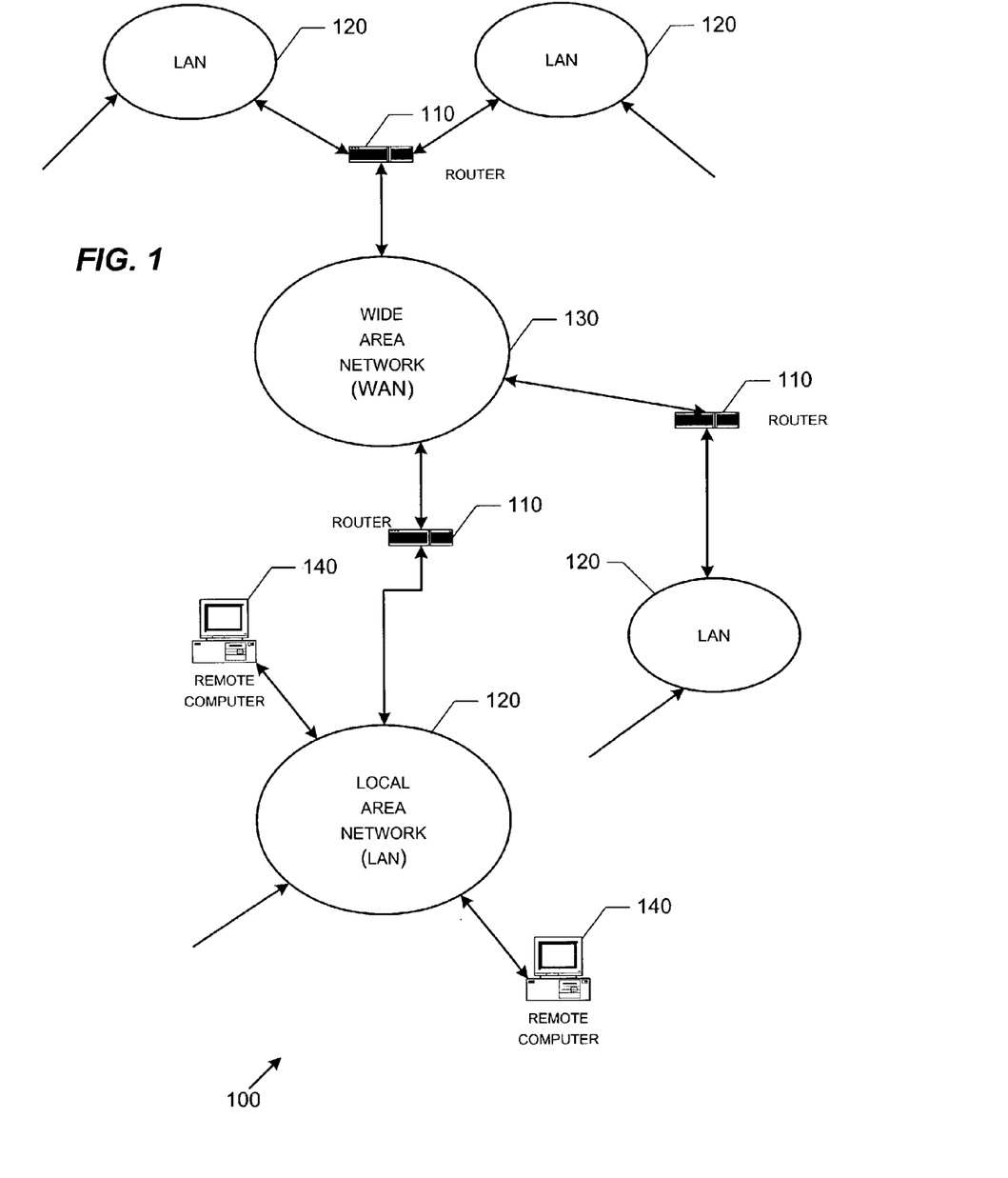
FIGS. 1-3 show components of an exemplary environment in which the invention may be practiced.
Figure 2:
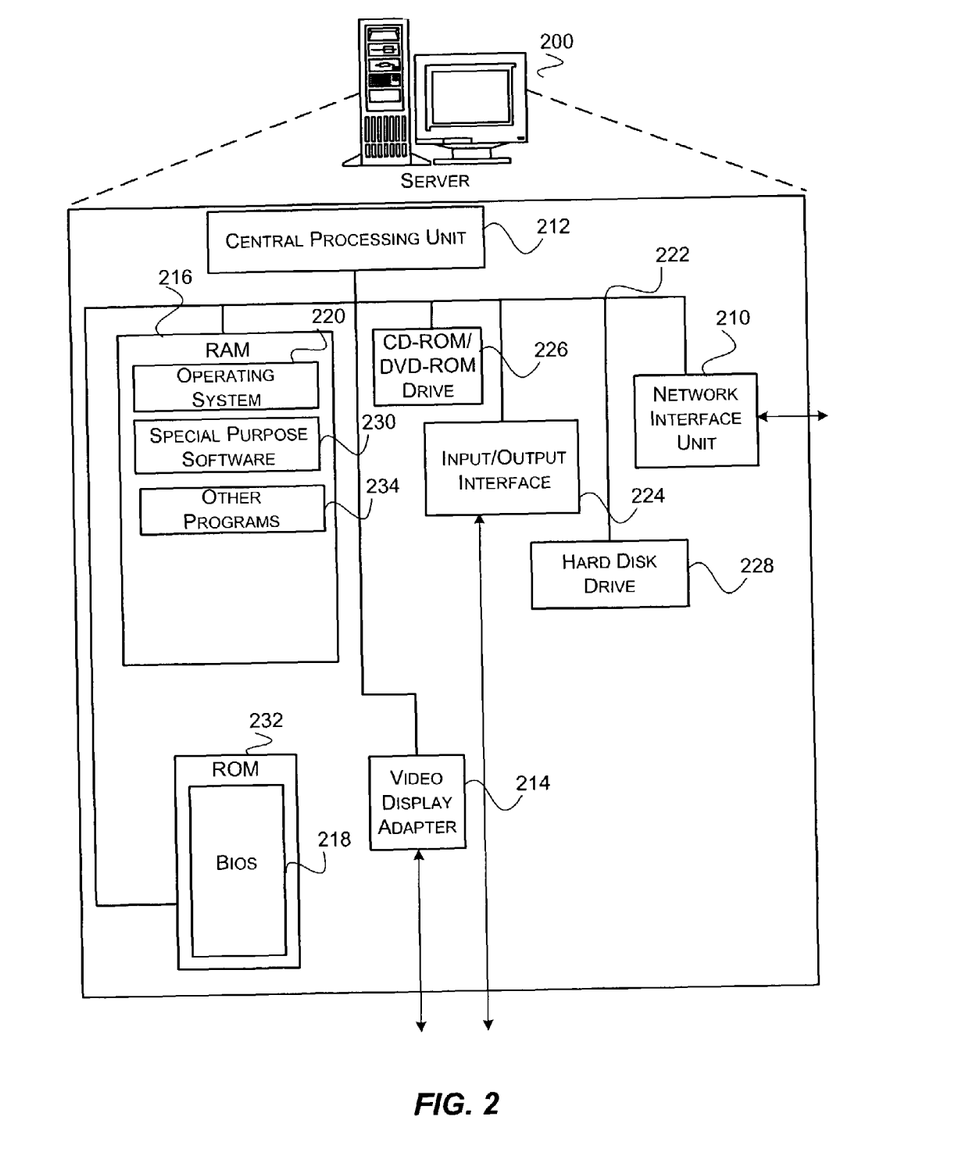
Figure 3:
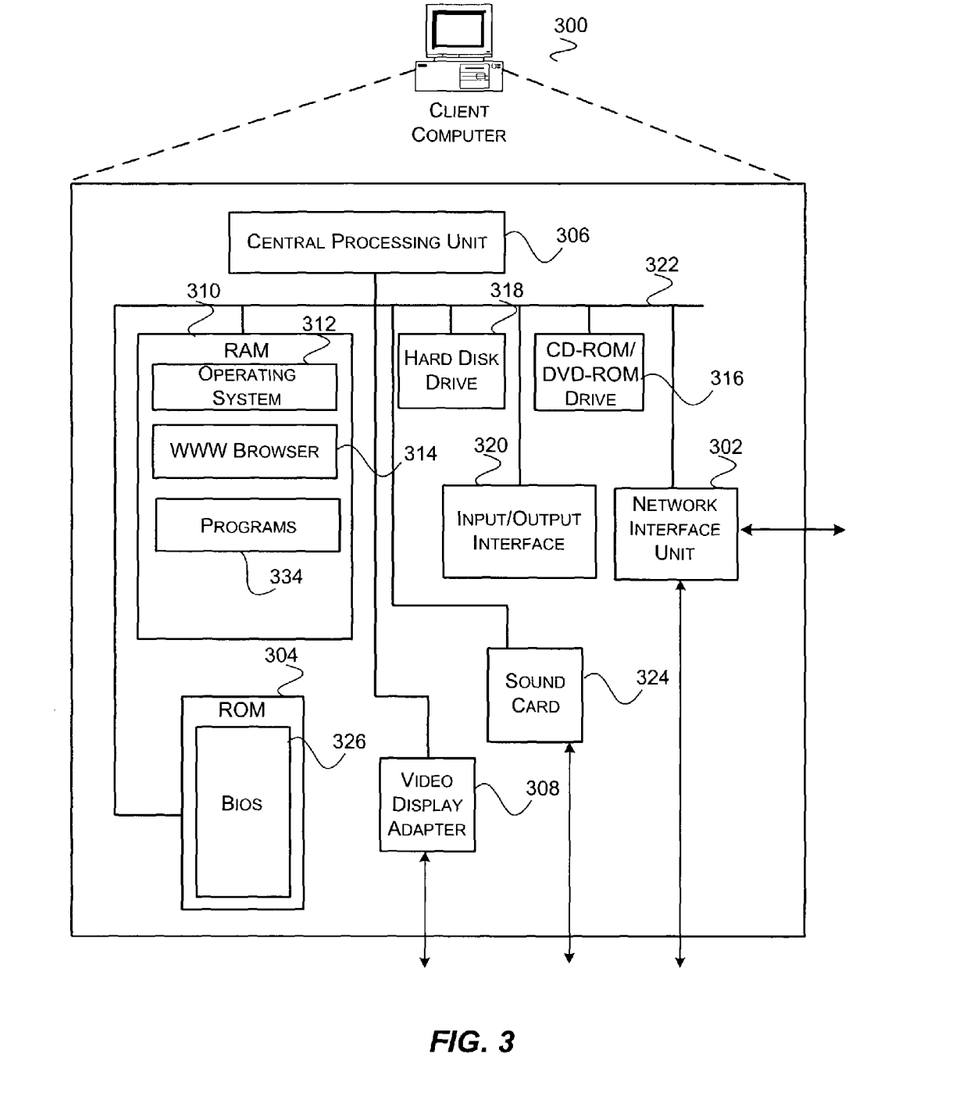

FIGS. 1-3 show components of an exemplary environment in which the invention may be practiced. Not all the components may be required to practice the invention, and variations in the arrangement and type of the components may be made without departing from the spirit or scope of the invention.

FIG. 1 shows a plurality of local area networks ("LANs") 120 and wide area network ("WAN") 130 interconnected by routers 110. Routers 110 are intermediary devices on a communications network that expedite message delivery. On a single network linking many computers through a mesh of possible connections, a router receives transmitted messages and forwards them to their correct destinations over available routes. On an interconnected set of LANs—including those based on differing architectures and protocols—, a router acts as a link between LANs, enabling messages to be sent from one to another. Communication links within LANs typically include twisted pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links known to those skilled in the art. Furthermore, computers, such as remote computer 140, and other related electronic devices can be remotely connected to either LANs 120 or WAN 130 via a modem and temporary telephone link. The number of WANs, LANs, and routers in FIG. 1 may be increased or decreased arbitrarily without departing from the spirit or scope of this invention.

As such, it will be appreciated that the Internet itself may be formed from a vast number of such interconnected networks, computers, and routers. Generally, the term "Internet" refers to the worldwide collection of networks, gateways, routers, and computers that use the Transmission Control Protocol/Internet Protocol ("TCP/IP") suite of protocols to communicate with one another. At the heart of the Internet is a backbone of high-speed data communication lines between major nodes or host computers, including thousands of commercial, government, educational, and other computer systems, that route data and messages. An embodiment of the invention may be practiced over the Internet without departing from the spirit or scope of the invention.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

The Internet has recently seen explosive growth by virtue of its ability to link computers located throughout the world. As the Internet has grown, so has the WWW. Generally, the WWW is the total set of interlinked hypertext documents residing on HTTP (hypertext transport protocol) servers around the world. Documents on the WWW, called pages or Web pages, are typically written in HTML (Hypertext Markup Language) or some other markup language, identified by URLs (Uniform Resource Locators) that specify the particular machine and pathname by which a file can be accessed, and transmitted from server to end user using HTTP. Codes, called tags, embedded in an HTML document associate particular words and images in the document with URLs so that a user can access another file, which may literally be halfway around the world, at the press of a key or the click of a mouse. These files may contain text (in a variety of fonts and styles), graphics images, movie files, media clips, and sounds as well as Java applets, ActiveX controls, or other embedded software programs that execute when the user activates them. A user visiting a Web page also may be able to download files from an FTP site and send messages to other users via email by using links on the Web page.

A server providing a WWW site, as the server described in more detail in conjunction with FIG. 2 may, is a computer connected to the Internet having storage facilities for storing hypertext documents for a WWW site and running administrative software for handling requests for the stored hypertext documents. A hypertext document normally includes a number of hyperlinks, i.e., highlighted portions of text which link the document to another hypertext document possibly stored at a WWW site elsewhere on the Internet. Each hyperlink is associated with a URL that provides the location of the linked document on a server connected to the Internet and describes the document. Thus, whenever a hypertext document is retrieved from any WWW server, the document is considered to be retrieved from the WWW. A WWW server may also include facilities for storing and transmitting application programs, such as application programs written in the JAVA programming language from Sun Microsystems, for execution on a remote computer. Likewise, a WWW server may also include facilities for executing scripts and other application programs on the WWW server itself.

A user may retrieve hypertext documents from the WWW via a WWW browser application program located on a wired or wireless device. A WWW browser, such as Netscape's NAVIGATOR® or Microsoft's INTERNET EXPLORER®, is a software application program for providing a graphical user interface to the WWW. Upon request from the user via the WWW browser, the WWW browser accesses and retrieves the desired hypertext document from the appropriate WWW server using the URL for the document and HTTP. HTTP is a higher-level protocol than TCP/IP and is designed specifically for the requirements of the WWW. HTTP is used to carry requests from a browser to a Web server and to transport pages from Web servers back to the requesting browser or client. The WWW browser may also retrieve application programs from the WWW server, such as JAVA applets, for execution on a client computer.

FIG. 2 shows an exemplary server that may operate to provide a WWW site, among other things. Such a device may be used, for example, as a workstation, network appliance, router, bridge, firewall, gateway, traffic management device, and/or other server. When used to provide a WWW site, server 200 transmits WWW pages to the WWW browser application program executing on requesting devices to carry out this process. For instance, server 200 may transmit pages and forms for receiving information about a user, such as address, telephone number, billing information, credit card number, etc. Moreover, server 200 may transmit WWW pages to a requesting device that allow a consumer to participate in a WWW site. The transactions may take place over the Internet, WAN/LAN 100, or some other communications network known to those skilled in the art.

It will be appreciated that server 200 may include more or fewer components than those shown in FIG. 2. However, the components shown are sufficient to disclose an illustrative environment for practicing the present invention. As shown in FIG. 2, server 200 may be connected to WAN/LAN 100, or other communications network, via network interface unit 210. Network interface unit 210 includes the necessary circuitry for connecting server 200 to WAN/LAN 100, and is constructed for use with various communication protocols including the TCP/IP protocol. Network interface unit 210 may include or interface with circuitry and components for transmitting messages and data over a wired and/or wireless communications medium. Typically, network interface unit 210 is a card contained within server 200.

Server 200 may also include processing unit 212, video display adapter 214, and a mass memory, all connected via bus 222. The mass memory generally includes random access memory ("RAM") 216, read-only memory ("ROM") 232, and one or more permanent mass storage devices, such as hard disk drive 228, a tape drive (not shown), optical drive 226, such as a CD-ROM/DVD-ROM drive, and/or a floppy disk drive (not shown). The mass memory stores operating system 220 for controlling the operation of server 200. It will be appreciated that this component may comprise a general purpose operating system including, for example, UNIX, LINUX™, or one produced by Microsoft Corporation of Redmond, Wash. Basic input/output system ("BIOS") 218 is also provided for controlling the low-level operation of server 200.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory may also store program code and data for providing a WWW site. More specifically, the mass memory may store applications including special purpose software 230, and other programs 234. Special purpose software 230 may include a WWW server application program that includes computer executable instructions which, when executed by server 200, generate WWW browser displays, including performing the logic described above. Server 200 may include a JAVA virtual machine, an SMTP handler application for transmitting and receiving email, an HTTP handler application for receiving and handing HTTP requests, JAVA applets for transmission to a WWW browser executing on a client computer, and an HTTPS handler application for handling secure connections. The HTTPS handler application may be used for communication with an external security application to send and receive sensitive information, such as credit card information, in a secure fashion.

Server 200 may also comprise input/output interface 224 for communicating with external devices, such as a mouse, keyboard, scanner, or other input devices not shown in FIG. 2. In some embodiments of the invention, computing device does not include user input/output components. For example, server 200 may or may not be connected to a monitor. In addition, server 200 may or may not have video display adapter 214 or input/output interface 224. For example server 200 may implement a network appliance, such as a router, gateway, traffic management device, etc., which is connected to a network and that does not need to be directly connected to user input/output devices. Such a device may be accessible, for example, over a network.

Server 200 may be implemented as a blade server. A blade is a card inserted into a hardware chassis. A blade may include, for example, one or more processors, volatile and non-volatile memory, interfaces suitable for transferring information to and from the blade, and other components known to those skilled in the art. For example, a blade may include a specialized interface for transferring information to a backplane and other interfaces, such as a USB port, serial port, RF interface, IR interface, and IDE controller for transferring information to other devices.

FIG. 3 depicts several components of client computer 300. Client computer 300 may include more or fewer components than those shown in FIG. 3. However, the components shown are sufficient to disclose an illustrative environment for practicing the present invention. As shown in FIG. 3, client computer 300 includes network interface unit 302 for connecting to a LAN or WAN, or for connecting remotely to a LAN or WAN. Network interface unit 302 includes the necessary circuitry for such a connection, and is also constructed for use with various communication protocols including the TCP/IP protocol, the particular network configuration of the LAN or WAN it is connecting to, and a particular type of coupling medium. Network interface unit 302 may also be capable of connecting to the Internet through a point-to-point protocol ("PPP") connection or a serial line Internet protocol ("SLIP") connection.

Client computer 300 also includes BIOS 326, processing unit 306, video display adapter 308, and memory. The memory generally includes RAM 310, ROM 304 and a permanent mass storage device, such as a disk drive. The memory stores operating system 312 and programs 334 for controlling the operation of client computer 300. The memory may also include WWW browser 314, such as Netscape's NAVIGATOR® or Microsoft's INTERNET EXPLORER® browsers, for accessing the WWW. It will be appreciated that these components may be stored on a computer-readable medium and loaded into memory of client computer 300 using a drive mechanism associated with the computer-readable medium, such as a floppy disk drive (not shown), optical drive 316, such as a CD-ROM/DVD-ROM drive, and/or hard disk drive 318. Input/output interface 320 may also be provided for receiving input from a mouse, keyboard, or other input device. The memory, network interface unit 302, video display adapter 308, and input/output interface 320 are all connected to processing unit 306 via bus 322. Other peripherals may also be connected to processing unit 306 in a similar manner.

As will be recognized from the discussion below, aspects of the invention may be embodied on server 200 acting as a traffic management device or on some combination thereof. For example, programming steps may be contained in special purpose software 230.

Illustrative Arrangement and Interaction of Elements

Figure 4:
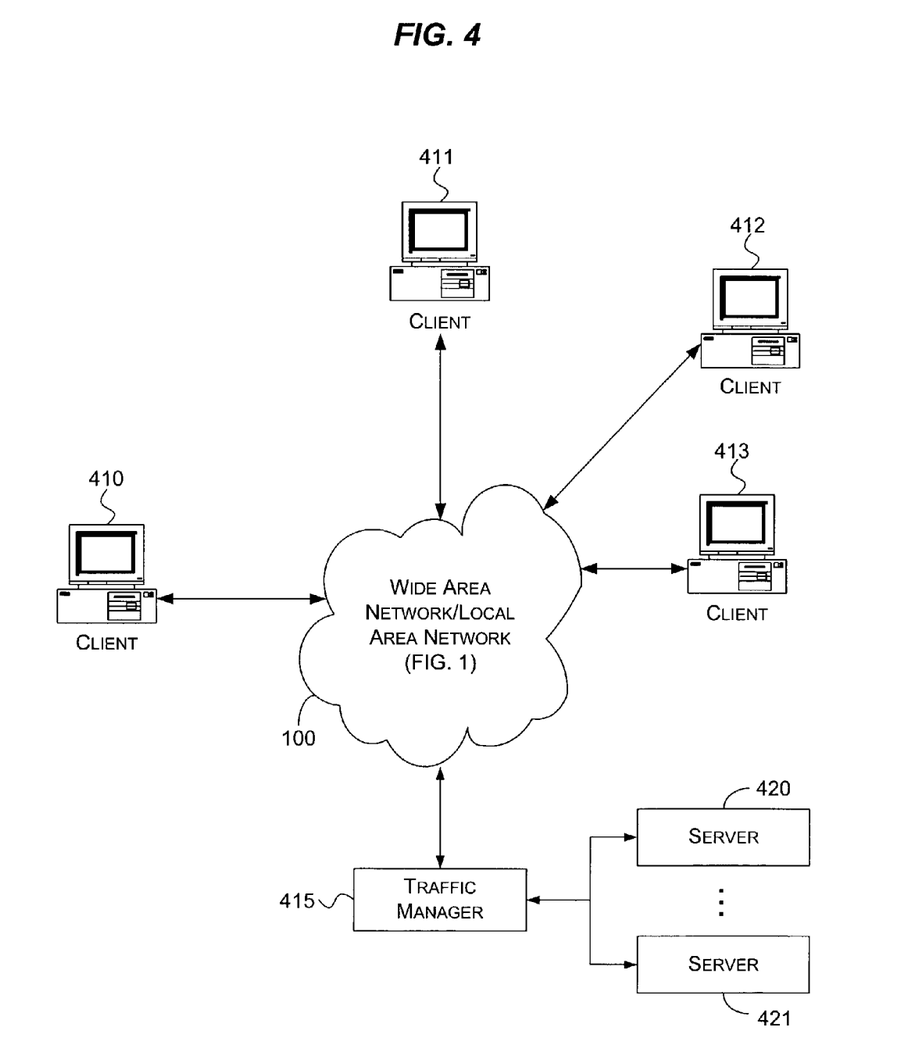
FIG. 4 illustrates an exemplary environment in which the invention operates.

FIG. 4 illustrates an exemplary environment in which the invention operates, according to one embodiment of the invention. The environment includes clients 410-413, WAN/LAN 100, traffic manager 415, and a server array. The server array includes servers 420 and 421. WAN/LAN 100 couples clients 410-413 to traffic manager 415. Traffic manager 415 couples the server array to WAN/LAN 100.

Clients 410-413 are any devices capable of connecting with WAN/LAN 100. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, and the like. Alternatively, clients 410-413 may be any devices that are capable of connecting using a wired or wireless communication medium such as a PDA, POCKET PC, wearable computer, or other devices mentioned above that are equipped to use a wired and/or wireless communications medium. An exemplary client that may connect with WAN/LAN 100 is client computer 300 of FIG. 3.

A client, such as one of clients 410-413, may sometimes act as a server. That is, a client is not constrained to be a device that always requests services; rather, it may also be a device that usually provides services to other clients.

WAN/LAN 100 is any network or group of networks that can connect clients 410-413 to traffic manager 415. WAN/LAN 100 is described in more detail in conjunction with FIG. 1. The Internet is an example of a network that may connect client 410-413 to traffic manager 415.

Traffic manager 415 receives packets from WAN/LAN 100 and from the server array. In some operations, traffic manager 415 acts like a layer 7 switch. That is, it may look at content associated with higher TCP/IP layers of the packet, e.g. a request for an HTML page such as http://www.favorites.com/newthings.html and information that identifies the user, such as a cookie, etc. It may store information in memory so that next time the requestor requests more information from http://www.favorites.com each request is sent to the same server. A traffic manager, such as traffic manager 415, may do this, in part, to ensure that the user is connected to the server that the user previously connected to. This helps prevent the loss of transaction data, such as items in a shopping cart.

In addition, traffic manager 415 may perform network address translation (NAT). That is, in a TCP/IP packet, it may change the source and/or destination field. This may be done for many reasons. One reason is so that intranets can keep their own private address space and not have to use publicly routable addresses, which may be difficult to obtain. Traffic manager 415 may maintain state information to gracefully close a connection if, for example, a server fails. In addition, traffic manager 415 may maintain state information to reroute a connection to another server if the server fails.

For example, if a server, such as server 420, requested stock information from a stock server (not shown) connected to WAN/LAN 100, the server would give its IP address as the source address so that the stock server would know where to respond to. Traffic manager 415 could replace the source IP address of the request with an IP address associated with traffic manager 415 so that the stock server would respond to traffic manager 415 instead of server 420. This allows traffic manager 415 to maintain state information, provide security, and gracefully shut down or transfer a connection between the stock server and server 420.

Establishing and shutting down TCP/IP connections generally causes a lot of overhead. For example, to set up a TCP/IP connection between two devices may require over three messages to be sent between the two devices. Shutting down the connection between the two devices may require two or more messages to be sent between the two devices.

When a client has established a connection, it may send several requests before closing the connection. For example, the client may request a WWW page, request an mp3 file, and then request a graphics image. A server array may be set up such that one server serves WWW pages, another server serves mp3 files, and another server serves images. A traffic manager that manages traffic between the client and the server array ideally would send each request to the appropriate server. Instead of opening a new connection to each server, a traffic manager may maintain a pool of connections with servers in the server array. When a client requests content, the traffic manager may use one of its previously opened connections to relay the request to an appropriate server.

A traffic manager may be configured to maintain at least one connection to each server for each active connection between the traffic manager and a client. Information regarding a connection including a client's IP address and port number, a server's IP address and port number, a number indicating the next sequence number to send to the server, a number indicating the next sequence number to send to the client, and buffers to hold data may be stored in a structure or object (hereinafter "connection object") on a computer storage medium associated with the traffic manager. This data may consume between 250 bytes and 500 bytes of memory or more per active connection. With a sufficient number of connections, a traffic manager may no longer have enough high-speed memory to maintain state information for each active connection.

Thus, according to an embodiment of the invention, when a connection between a traffic manager and a server in a server array becomes idle, the traffic manager may copy a subset of state information in the connection object to another object. The traffic manager may then free the memory associated with the connection object and allows it to be used to store other data. When the traffic manager needs to use an idle connection between the traffic manager and the server again, the traffic manager may then copy the state information from the other object to a connection object and resume communicating with the server without reestablishing a TCP/IP connection with the server.

A connection between a traffic manager and a server in a server array may become idle when it is no longer actively being used to transmit data. For example, in the example above where a client requests a WWW page, an mp3 file, and then a graphics image, when the client requests the mp3 file, the traffic manager may determine that the connection that was used to transmit the WWW page is no longer active. The traffic manager may then proceed to copy essential state information to another object and free the memory associated with the connection object. Similarly, when the client requests a graphics file, the traffic manager may determine that the connection that was used to transmit the graphics file is no longer active and may perform appropriate processing. In addition, the connection used on behalf of a client between the traffic manager and a server just before a client closes a connection may be deemed inactive. In short, any event that indicates that a connection between the traffic manager and a server may no longer being actively used may trigger the connection to be marked as inactive and the copying of connection state information to another object as described above.

In another embodiment of the invention, the state information used to maintain an active connection is divided into an essential portion that is to be maintained even when the connection is inactive and a non-essential portion that may be freed when the connection is inactive. Rather than copying the state information to another object when a connection becomes inactive, the non-essential portion of the connection object may be freed. When a connection is reactivated, memory for the non-essential portion may then be allocated to be used while active.

A traffic manager, such as traffic manager 415, is any device that manages network traffic. Such devices may include, for example, routers, proxies, firewalls, load balancers, devices that perform network address translation, any combination of the preceding devices, and the like. A traffic manager may, for example, control the flow of data packets delivered to and forwarded from an array of servers, such as servers 420-421. These servers may be used, for example, as Web servers. A traffic manager may direct a request for a resource to a particular Web server based on network traffic, network topology, capacity of the server, content requested, and a host of other traffic management metrics. A traffic manager may receive data packets from and transmit data packets to the Internet, an intranet, or a local area network accessible through another network. A traffic manager may recognize packets that are part of the same communication, flow, and/or stream and may perform special processing on such packets, such as directing them to the same server so that state information is maintained. A traffic manager may support a wide variety of network applications such as Web browsing, email, telephony, streaming multimedia, and other traffic that is sent in packets.

A traffic manager may be implemented using one or more personal computers, POCKET PCs, blades, components of a blade, wearable computers, processors, multiprocessor systems, microprocessor-based or programmable consumer electronics, network PCs, cell phones, smart phones, pagers, walkie talkies, radio frequency (RF) devices, infrared (IR) devices, CBs, integrated systems or devices combining one or more of the preceding devices, and the like. For example, a traffic manager may be implemented as a blade, as multiple blades, as a server that includes a blade and other components, or as a component of a blade. Such devices may be implemented solely in hardware or in hardware and software. For example, such devices may include some application specific integrated circuits (ASICs) coupled to one or more microprocessors. The ASICs may be used to provide a high-speed switch fabric while the microprocessors may perform higher layer processing of packets. An exemplary device that could be used as a traffic manager is server 200 of FIG. 2, configured with appropriate software. A traffic manager may have multiple network interface units and each network interface unit may interface with one or more networks.

Servers 420 and 421 generally include any devices capable of responding to a request from a requesting device, such as client computer 410. The set of such devices generally include the devices listed above in reference to a traffic manager. An exemplary device that could be used for server 420 and 421 is server 200 of FIG. 2, configured with appropriate software.

Flowcharts

Figure 5:
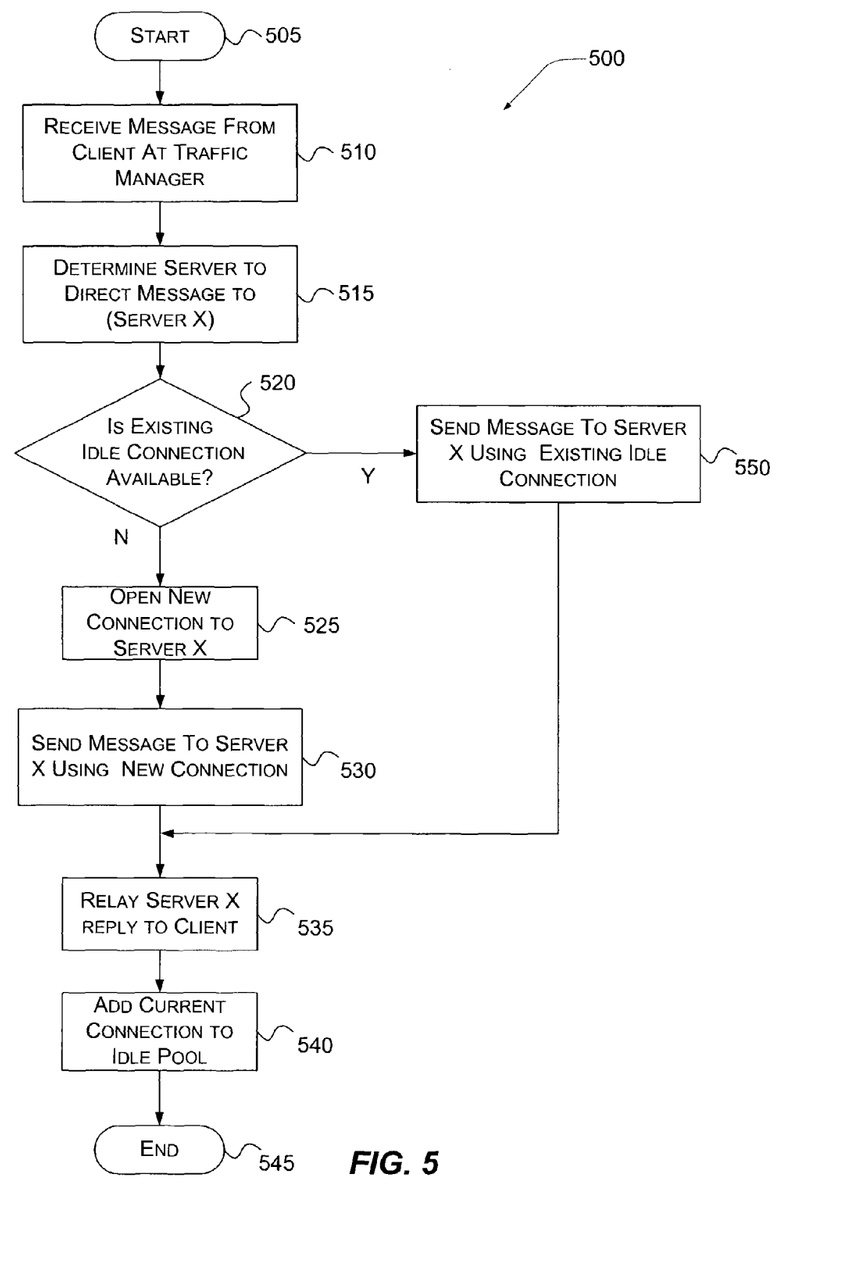
FIG. 5 illustrates a flowchart for reducing memory used for idle connections.

FIG. 5 illustrates a flowchart for reducing memory used for idle connections, according to one embodiment of the invention. Process 500 begins at block 505 when a traffic manager is ready to receive a message. After block 505, processing continues at block 510.

At block 510, a message is received from a client at a traffic manager. For example, referring to FIG. 4, traffic manager 415 receives a message from client computer 410. The message may be a request to access a particular HTML page, for example. After block 510, processing continues at block 515.

At block 515, a determination is made as to which server (hereinafter "server X") the message should be directed. For example, referring to FIG. 4, server 420 may be a server that serves HTML pages. Server 421 may be a server that serves mp3 files. Assuming the message was a request for an HTML page, traffic manager 415 would typically determine that server 420 should be the server to service the message. After block 515, processing continues to decision block 520.

At decision block 520, a determination is made whether an existing idle connection is available for use. In typical operations, a sequence of requests to server X by the same client may result in the server X connection going into and out of an idle connection pool. This occurs because it is not known with certainty that a next request is for the same server X. Therefore, the process looks to determine whether the idle connection has been reallocated. For example, referring to FIG. 4, traffic manager 415 may not have been currently communicating with server 420 on behalf of client computer 410. Therefore, the connection between server 420 and client 410 would have been added to the idle connection pool, as described below at block 540. If, however, the existing idle connection is available, processing branches to block 550; otherwise, processing continues to block 525.

At block 525, because the existing idle connection is no longer available, a new connection between the traffic manager and server X is opened. Process then flows to block 530, where the message is sent to server X using the newly opened connection. Processing continues to block 535.

At block 550, when the existing idle connection is available, it is restored. To restore the available idle connection to an active state, information associated with the idle state may be copied to a new object or memory may be allocated and associated with the idle state data to be used in actively communicating with server X. For example, referring to FIG. 4, traffic manager 415 may copy essential data such as client IP address, client port number, client packet sequence number, server IP address, server port number, and server packet sequence number into another object that also includes buffers and other data structures needed for an active connection. Once the idle connection is restored, the message is sent to server X using the restored connection. Data associated with the restored connection is updated appropriately by, for example, updating buffers, receive counts, send counts, packet counts, etc. For example, referring to FIG. 4, traffic manager 415 sends a message received from client computer 410 requesting an HTML page through a restored connection to server 420. After block 550, processing continues to block 535.

At block 535, a reply from server X is sent to the client using the active connection. For example, referring to FIG. 4, traffic manager 415 may receive a reply to the message from client computer 410. The reply may be received from server 420 using the active connection. The reply is forwarded by traffic manager 415 to client 410. After block 535, processing continues to block 540.

At block 540, the current connection is added to the idle connection pool. Adding the current connection to the idle connection pool makes it immediately available to another client and thereby minimizes client waits that may arise due to insufficient available connections. Data representing an idle state is saved for the current connection when it is added to the idle connection pool. This may occur, for example, as discussed previously in conjunction with FIG. 4. For example, essential data regarding a connection, such as client IP address, client port number, client packet sequence number, server IP address, server port number, and server packet sequence number may be saved while buffers and other non-essential data are deleted and made available for other uses. For example, referring to FIG. 4, traffic manager 415 saves essential information associated with an idle connection on a computer storage medium accessible by traffic manager 415. Traffic manager 415 also frees memory associated with non-essential information that is generally used during an active connection.

Upon completion of block 540, processing continues to block 545, where the processing ends. At this point, a message has been received from a client. A determination has been made as to which server, server X, should handle the message. If the connection maintained to server X was no longer available in the idle connection pool, a new connection was opened to the server. This new connection was used to send the message to server X; otherwise, the available idle connection was restored to send the message to server X. Upon relaying a reply from server X to the message, the current connection was added back to the idle connection pool. The above process may be repeated for each message received at a traffic manager.

Figure 6:
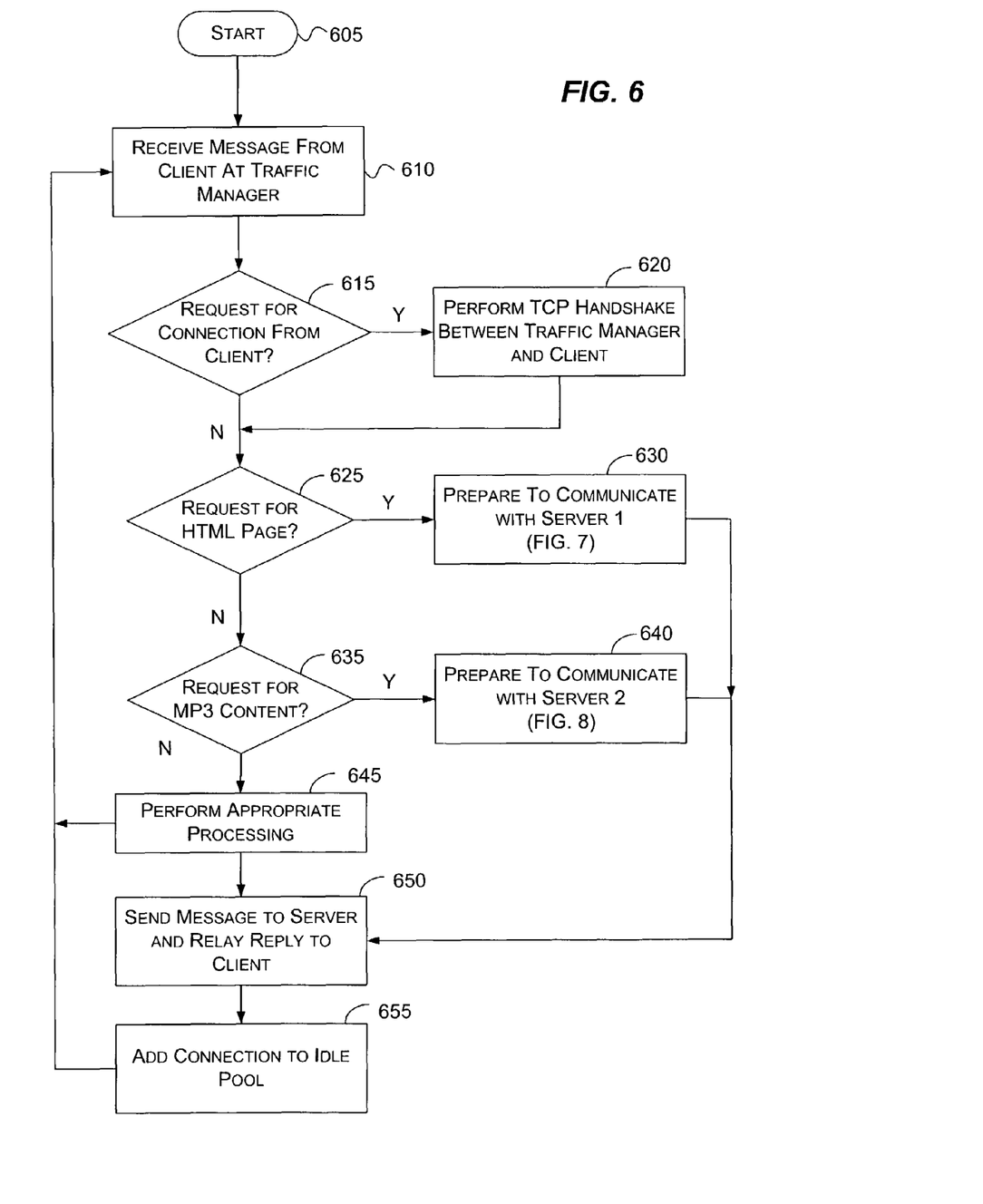
FIGS. 6-8 illustrate another flowchart for reducing memory used for idle connections in accordance with the invention.
Figure 7:
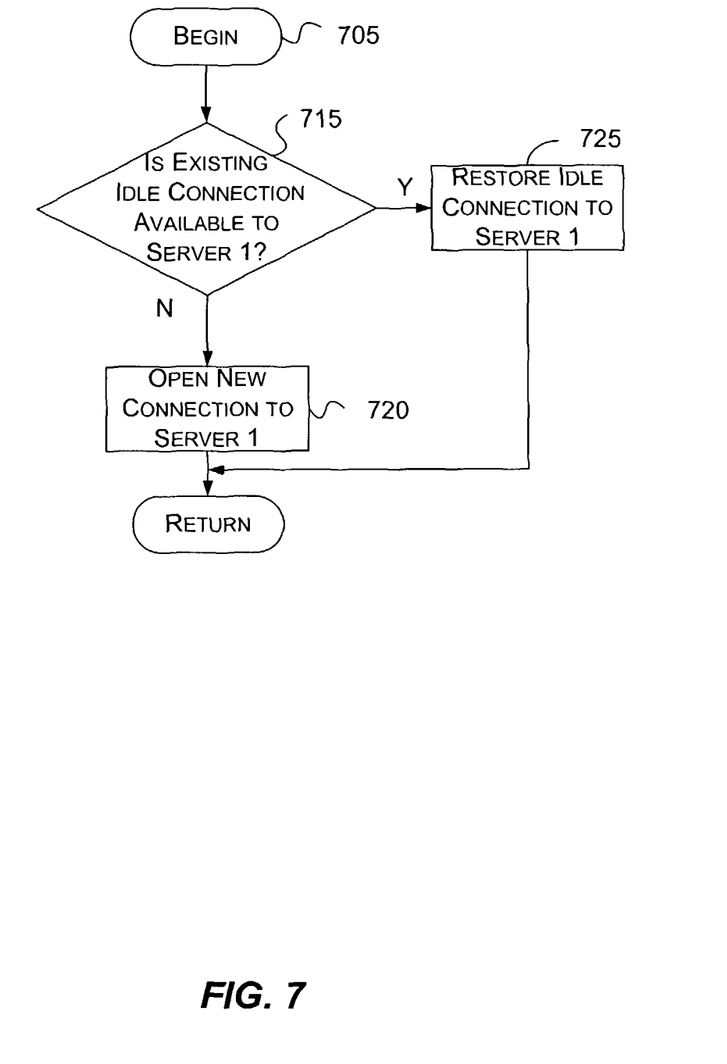
Figure 8:
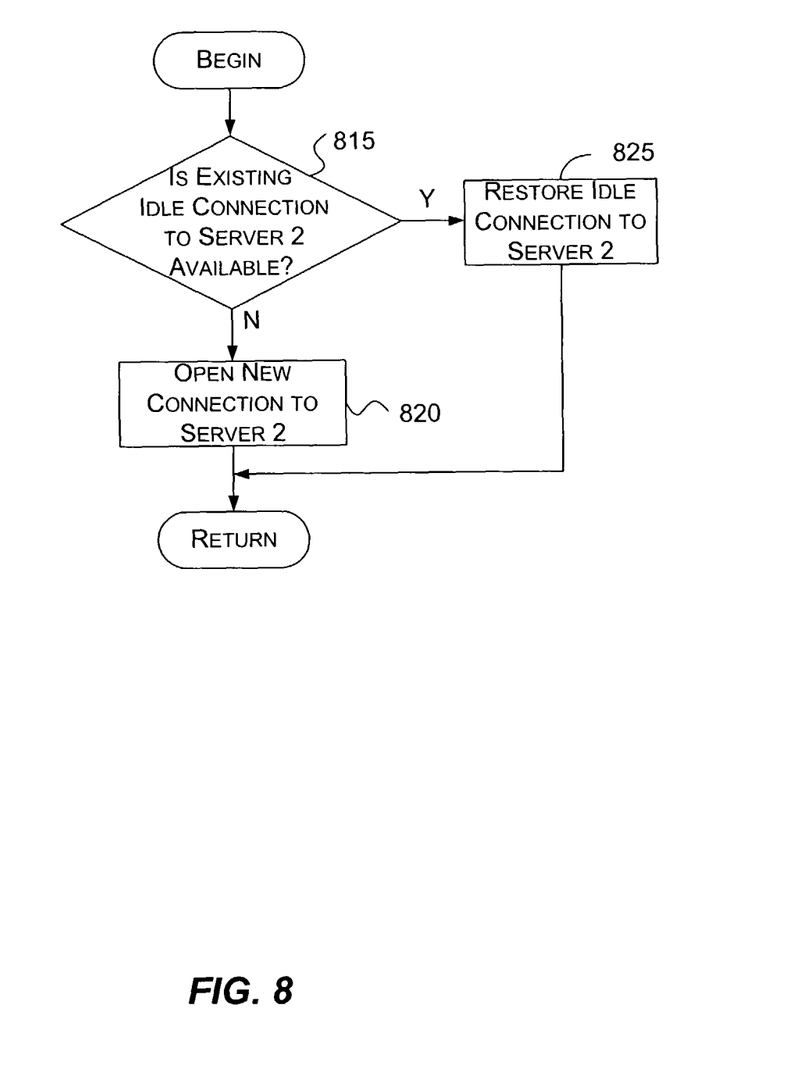

FIGS. 6-8 illustrate another embodiment of a flowchart for reducing memory used for idle connections, according to the present invention. The process illustrated in FIG. 6-8 may be employed as an alternative to process 500 described above.

In FIG. 6-8, it is assumed that at least one server (server 1) serves HTML pages and at least another server (server 2) serves mp3 files. Referring to FIG. 4, server 420 will be considered server 1 while server 421 will be considered server 2. The process illustrated in FIG. 6-8 begins at block 605 when a traffic manager is ready to receive a message. After block 605, processing continues at block 610.

At block 610, a message is received from a client at a traffic manager. For example, referring to FIG. 4, traffic manager 415 receives a message from client 410. The message may be a request to access a particular HTML page, for example. After block 610, processing continues to decision block 615.

At decision block 615, a determination is made as to whether the received message is a request for a connection from the client. If so, processing continues at block 620; otherwise, processing continues at block 625. For example, referring to FIG. 4, traffic manager 415 receives a first message from client 410. When a request for a connection is received, special processing may occur. For example, a traffic manager may need to establish a connection with a client so that data may be exchanged.

At block 620, a TCP handshake is performed between a traffic manager and a client. The handshake may include three or more packets sent between the traffic manager and the client. For example, if a client initiated a communication, the client may send a packet that includes a flag set, such as a SYN flag, to indicate that the client desires to negotiate a new connection. The traffic manager may then reply by sending a packet to the client, where the packet includes a flag set, such as a SYN-ACK flag, as part of the connection negotiation. The client may then respond with another packet including an acknowledgment of receiving the traffic manager's acknowledgment. The handshaking packets may include other information as well. After the handshake is performed successfully, the client and the traffic manager may send additional data through the established connection. For example, referring to FIG. 4, upon client 410's first message to traffic manager 415, client 410 and traffic manager 415 perform a TCP handshake. After block 620, processing continues to decision block 625.

At decision block 625, a determination is made as to whether the message includes a request for an HTML page. If it does, processing continues at block 630; otherwise, processing continues at decision block 635. Determining whether a message includes a request for an HTML page may be accomplished by inspecting portions of the message for certain strings. For example, a message may include the string "GET http://www.favorites.com/newthings.html." This may indicate that the message includes a request for an HTML page.

At block 630, preparations are made to communicate with a server that serves the requested HTML page. This is described in more detail in conjunction with FIG. 7. Briefly, however, a determination may be made as to whether an existing idle connection is still available to server 1, or should a new connection be activated between the traffic manager and server 1. After block 630, processing continues at block 650.

At decision block 635, a determination is made as to whether the message includes a request for an mp3 file. If it does, processing continues at block 640; otherwise, processing continues at block 645. Determining whether a message includes a request for an mp3 file may be accomplished by inspecting portions of the message for certain strings. For example, a message may include the string "GET http://www.favorites.com/tophits.mp3." This may indicate that the message includes a request for an mp3 file.

At block 640, preparations are made to communicate with a server that serves the requested mp3 file. This is described in more detail in conjunction with FIG. 8. Briefly, however, a determination may be made as to whether an existing idle connection is still available to server 2, or should a new connection be activated between the traffic manager and server 2. After block 640, processing continues at block 650.

At block 645, other appropriate processing may be performed. For example, other tests may be performed to determine an appropriate server to which to send a message. If it is determined that a server is available to service the request, processing similar to that shown in FIGS. 7 and 8 may be performed. If the message includes a request for a service not provided, an error may be generated and sent to the client. A message may request a configuration change on the traffic manager. If so, the traffic manager may use the message to perform the configuration change. A message may include a request for the traffic manager to go offline. If so, the traffic manager may stop managing traffic to a server array until it receives a message that includes a request to go online. After block 645, processing may continue at block 610 or block 650, depending on the message received. For example, after a message requesting a configuration change of the traffic manager, processing may continue at block 610. After a message requesting an image file, for example, processing may continue at block 650 after preparing to communicate with an image server.

At block 650 a message is sent to the selected server and the response from server is relayed back to the client. For example, referring to FIG. 4, traffic manager sends a request from client 410 for an HTML page to server 420 and relays server 420's response to client 410. After block 650, processing continues at block 655, where the current connection is added to the idle connection pool to become available to a next communication request. This may be done in many ways as previously discussed. For example, referring to FIG. 4, traffic manager 415 may save essential state information regarding a connection to server 420 in a computer storage medium accessible by traffic manager 415 while discarding non-essential state information. Processing then continues to block 610.

The process above may continue indefinitely or until a traffic manager is brought offline or otherwise disabled. With each execution of the process above, a message may be received by a traffic manager. If the message is the first message a traffic manager has received from a client, the traffic manager may establish a connection with the client. The traffic manager may then determine a server to which to send the message and may prepare to communicate with the server. After preparing to communicate with the server, the traffic manager may send a message to the server and relay a reply to the client. Upon relay of the reply, the current connection is made available to a future request. Other processing may be performed, depending on the nature of the message.

FIG. 7 illustrates a flowchart of a process that may be called to prepare to communicate with a server, according to one embodiment of the invention. The process begins at block 705 when called. After block 705, processing continues to decision block 715:

At decision block 715, a determination is made as to whether an existing idle connection is available for use by server 1. If so, processing continues to block 725; otherwise, processing continues at block 720. Connected in this sense refers to whether the traffic manager has an active (or non-idle) connection to a server other than server 2. This may occur, for example, if the server just transmitted a message on behalf of the client through a connection to a server other than server 2. The essence of the test at block 715 is whether there is an idle connection that may be restored because of an earlier client's message to server 1. For example, referring to FIG. 4, if traffic manager 415 had just referred a message from client 410 to server 420 and then received a message from client 410 to send to server 420, traffic manager 415 may determine whether the connection used to transmit a message to server 420 is available for reuse from the idle connection pool.

At block 725, a connection is restored to server 1 using previous idle state connection data. If a previous connection usable for a communication between the requesting client and server 1 is available in the idle connection pool, information associated with the idle state may be used to create a data structure associated with an active connection between a traffic manager and server 1. After block 725, processing returns to the calling process.

At block 720, because no existing idle connection to server 1 is available for use in a communication from the client, a new connection is created and a data structure associated with the connection is established. After block 720, processing returns to the calling process.

At this point, if the traffic manager was actively connected to server 1, and the idled connection is still available, previous idle state connection data is employed to restore the connection; otherwise, a new connection is opened to server 1.

FIG. 8 illustrates a flowchart of a process that may be called to prepare to communicate with a server, according to one embodiment of the invention. This process is essentially a mirror of the process illustrated in FIG. 7. The process begins at block 805 when called. After block 805, processing continues at decision block 815.

At decision block 815, a determination is made as to whether an existing idle connection is available for use by server 2. If so, processing continues to block 825; otherwise, processing continues at block 820. Connected in this sense refers to whether the traffic manager has an active (or non-idle) connection to a server other than server 1. This may occur, for example, if the server just transmitted a message on behalf of the client through a connection to a server other than server 1. The essence of the test at block 815 is whether there is an idle connection that may be restored because of an earlier client's message to server 2. For example, referring to FIG. 4, if traffic manager 415 had just referred a message from client 410 to server 421 and then received a message from client 410 to send to server 421, traffic manager 415 may determine whether the connection used to transmit a message to server 421 is available for reuse from the idle connection pool.

At block 825, a connection is restored to server 2 using previous idle state connection data. If a previous connection usable for a communication between the requesting client and server 2 is available in the idle connection pool, information associated with an idle state may be used to create a data structure associated with an active connection between a traffic manager and server 2. After block 825, processing returns to the calling process.

At block 820, because no existing idle connection to server 2 is available for use in a communication from the client, a new connection is created and a data structure associated with the connection is established. After block 820, processing returns to the calling process. At this point, if the traffic manager was actively connected to server 2, and the idled connection is still available, previous idle state connection data is employed to restore the connection; otherwise, a new connection is opened to server 2.

The various embodiments of the invention may be implemented as a sequence of computer implemented steps or program modules running on a computing system and/or as interconnected machine logic circuits or circuit modules within the computing system. The implementation is a matter of choice dependent on the performance requirements of the computing system implementing the invention. In light of this disclosure, it will be recognized by one skilled in the art that the functions and operation of the various embodiments disclosed may be implemented in software, in firmware, in special purpose digital logic, or any combination thereof without deviating from the spirit or scope of the present invention.

The above specification, examples and data provide a complete description of the manufacture and use of the composition of the invention. Since many embodiments of the invention can be made without departing from the spirit or scope of the invention, the invention resides in the claims hereinafter appended.

What is claimed is:

1. A method of forwarding messages over a network, comprising:
creating a first TCP/IP connection between a network device and a client;
creating a second TCP/IP connection between the network device and a server;
storing essential TCP/IP connection information associated with each of the first TCP/IP connection and the second TCP/IP connection in a connection object;
allocating a memory for, and storing therein, non-essential TCP/IP connection information in the connection object;
forwarding a first message between the client and the server using the connection object;
saving on a computer storage medium accessible by the network device the essential TCP/IP connection information that was stored in the connection object and freeing the memory allocated in the connection object for non-essential TCP/IP connection information;
receiving, at the network device, a second message from the client;
copying the saved essential TCP/IP connection information into a new connection object; and
forwarding the second message to the server using the new connection object.

2. The method of claim 1, further comprising:
receiving a third message from the client to be forwarded to the server;
in response to receiving the third message, copying the saved essential TCP/IP connection information into another new connection object; and
if the second TCP/IP connection is unavailable, creating and employing a new TCP/IP connection between the network device and the server to forward the second message to the server.

3. The method of claim 1, wherein the network device is a traffic manager.

4. The method of claim 3, wherein the traffic manager selects the server to which to forward at least a portion of the first message.

5. The method of claim 1, wherein the essential TCP/IP connection information associated with the first TCP/IP connection includes an IP address, port number, and packet sequence number associated with the client and wherein the essential TCP/IP connection information associated with the second TCP/IP connection includes an IP address, port number, and packet sequence number associated with the server.

6. The method of claim 1, wherein saving the stored essential TCP/IP connection information includes copying the stored essential TCP/IP connection information into a computer storage medium.

7. The method of claim 1, wherein the saved essential TCP/IP connection information resides in a particular portion of random access memory (RAM) and wherein saving the essential TCP/IP connection information includes keeping the essential TCP/IP connection information in the particular portion of RAM.

8. The method of claim 1, wherein saving the essential TCP/IP connection information that was stored in the connection object and freeing the memory allocated for non-essential TCP/IP connection information in the connection object is performed in response to determining that the second TCP/IP connection is idle.

9. The method of claim 1, wherein saving the essential TCP/IP connection information that was stored in the connection object and freeing the memory allocated for non-essential TCP/IP connection information in the connection object is performed by copying the stored essential connection information to another object and freeing the connection object.

10. The method of claim 1, wherein the non-essential TCP/IP connection information includes a buffer.

11. A non-transitory computer-readable storage medium having computer-executable instructions for forwarding network messages, comprising:
- creating a first TCP/IP connection between a network device and a client;
- creating a second TCP/IP connection between the network device and a server;
- storing essential TCP/IP connection information associated with each of the first TCP/IP connection and the second TCP/IP connection in a connection object;
- allocating a memory for, and storing therein, non-essential TCP/IP connection information in the connection object;
- forwarding a first message between the client and the server using the connection object;
- determining if the second TCP/IP connection is not in use;
- if the second TCP/IP connection is determined to be not in use, saving on a computer storage medium accessible by the network device the essential TCP/IP connection information that was stored in the connection object and freeing the memory allocated in the connection object for non-essential TCP/IP connection information;
- receiving, at the network device, a second message from the client;
- copying the saved essential TCP/IP connection information into a new connection object; and
- forwarding the second message to the server using the new connection object.

12. The non-transitory computer-readable storage medium of claim 11, further comprising opening another connection between the network device and the server if a client is not authorized to employ the second TCP/IP connection.

13. The non-transitory computer-readable storage medium of claim 11, further comprising copying the saved essential TCP/IP connection information into the new connection object if the client is authorized to employ the second TCP/IP connection.

14. The non-transitory computer-readable storage medium of claim 11, further comprising:
- receiving another message from another client; and
- if the other client is authorized to employ the second TCP/IP connection, and the second TCP/IP connection is available for use, sending at least a portion of the other message to the server over the second TCP/IP connection.

15. An apparatus for forwarding network traffic, comprising:
- a non-transitory computer storage medium configured to store TCP/IP connection information associated with connections between clients and servers; and
- circuitry coupled to the computer storage medium, wherein the circuitry is arranged to perform actions, comprising:
  - creating a first TCP/IP connection between a network device and a client;
  - creating a second TCP/IP connection between the network device and a server;
  - storing essential TCP/IP connection information associated with each of the first TCP/IP connection and the second TCP/IP connection in a connection object;
  - allocating a memory for, and storing therein, non-essential TCP/IP connection information in the connection object;
  - forwarding a first message between the client and the server using the connection object;
  - saving on a computer storage medium accessible by the network device the essential TCP/IP connection information that was stored in the connection object and freeing the memory allocated in the connection object for non-essential TCP/IP connection information;
  - receiving, at the network device, a second message from the client;
  - copying the saved essential TCP/IP connection information into a new connection object; and
  - forwarding the second message to the server using the new connection object.

16. The apparatus of claim 15, wherein the circuitry is disposed on at least one blade.

17. The apparatus of claim 15, wherein the circuitry includes at least one processor.

18. An apparatus for forwarding network traffic, comprising:
- a storage medium that stores state information associated with connections between clients and servers;
- an interface that receives messages from a client;
- a means for creating a first TCP/IP connection between a network device and a client;
- a means for creating a second TCP/IP connection between the network device and a server;
- a means for storing essential TCP/IP connection information associated with each of the first TCP/IP connection and the second TCP/IP connection in a connection object;
- a means for allocating a memory for, and storing therein, non-essential TCP/IP connection information in the connection object;
- a means for forwarding a first message between the client and the server using the connection object;
- a means for saving on a computer storage medium accessible by the network device the essential TCP/IP connection information that was stored in the connection object and a means for freeing the memory allocated in the connection object for non-essential TCP/IP connection information;
- a means for receiving, at the network device, a second message from the client;
- a means for copying the saved essential TCP/IP connection information into a new connection object; and
- a means for forwarding the second message to the server using the new connection object.

* * * * *